Patented Oct. 17, 1944

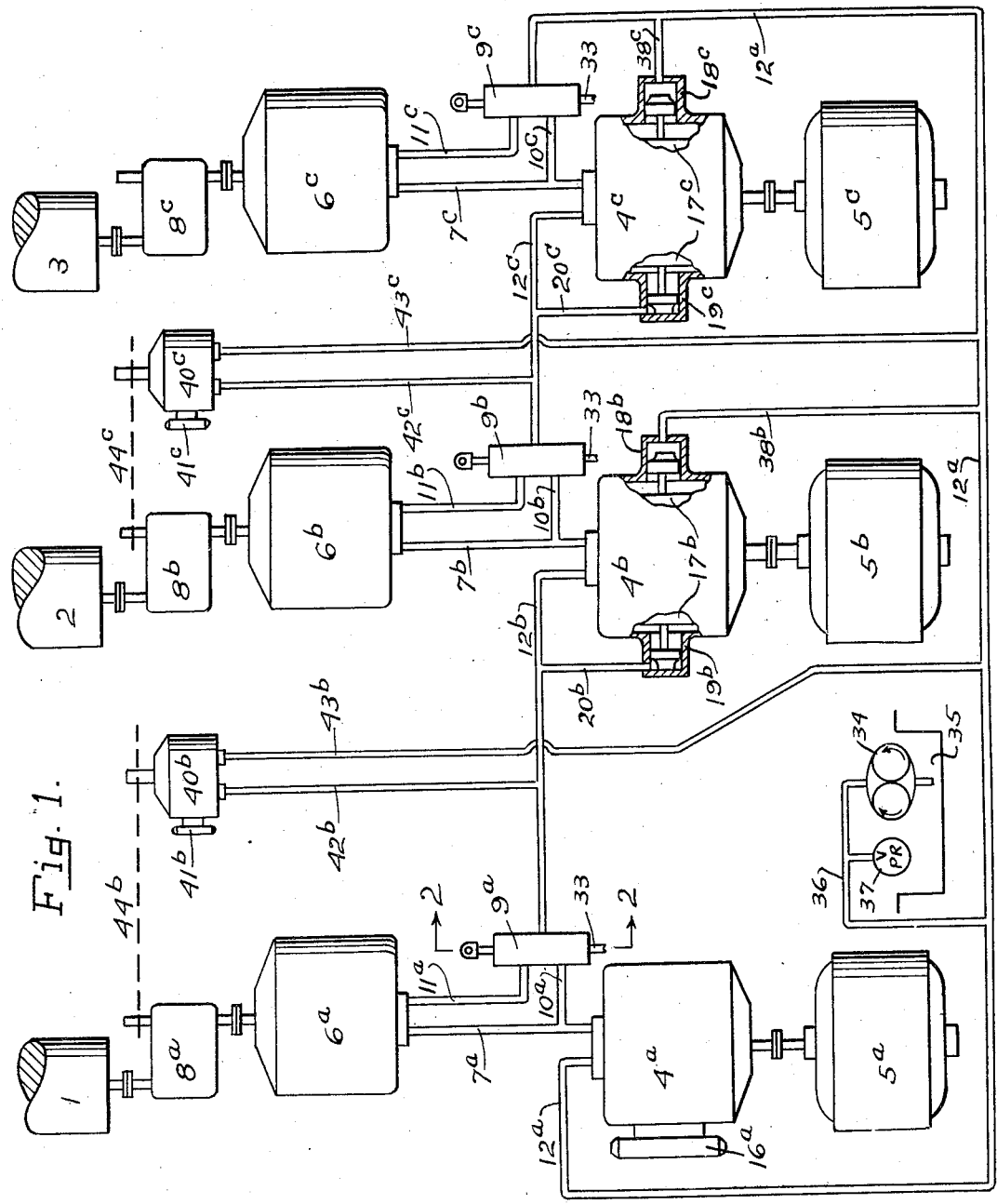

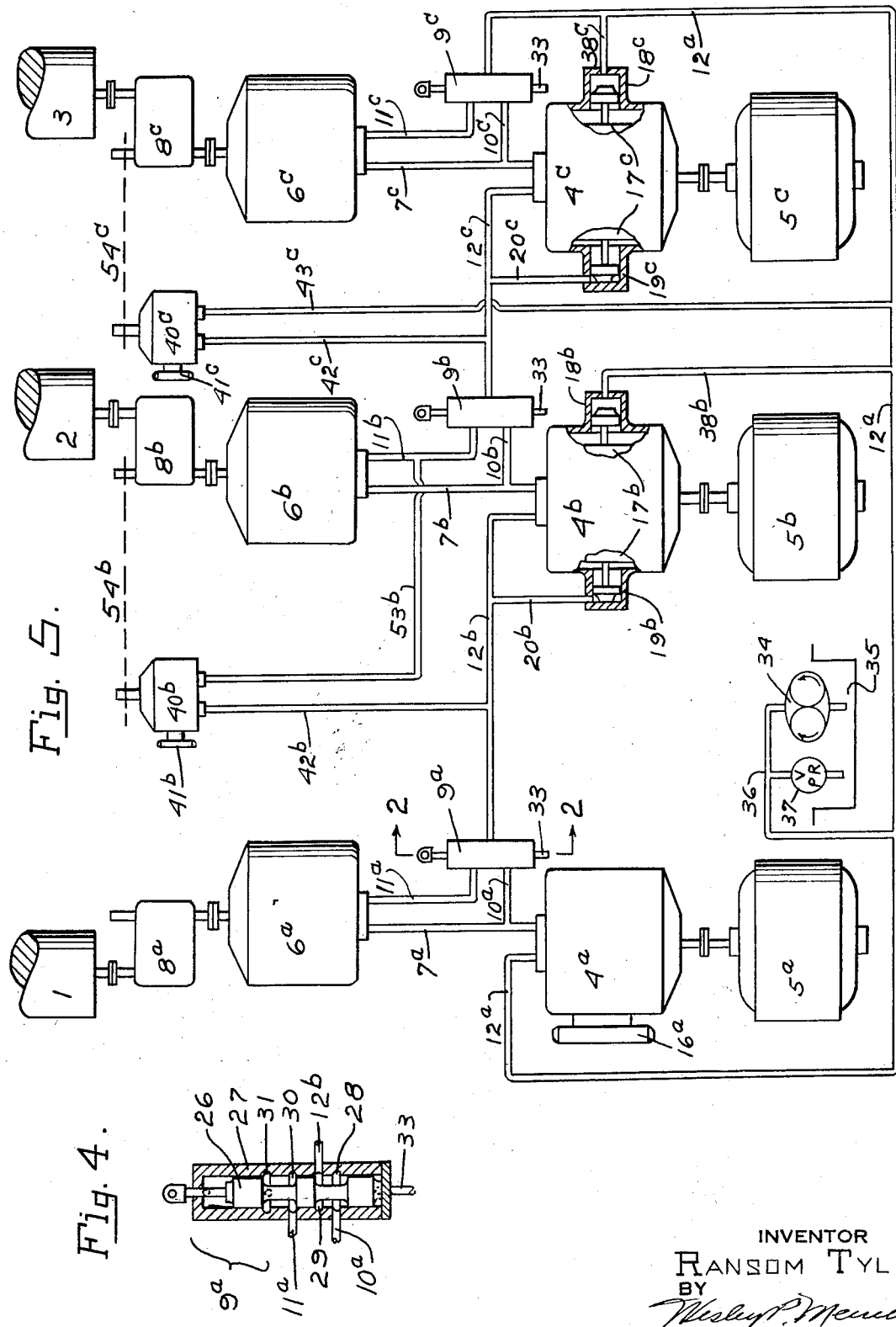

2,360,598

UNITED STATES PATENT OFFICE 2,360,598

HYDRAULIC DRIVE

Ransom Tyler, Greenfield, Wis., assignor to The Oilgear Company, Milwaukee, Wis., a corporation of Wisconsin Application January 21, 1943, Serial No. 473,095

16 Claims. (Cl. 60—53)

This invention relates to hydraulic drives of the type employed to drive a plurality of machines or a plurality of machine sections or members which should be driven at proportional speeds such as the several sections of a paper making machine or the sections of a printing press.

The drive to which the invention relates in particular includes a plurality of hydraulic motors, a pump for energizing each motor and means for maintaining the speeds of the motors as nearly proportional to each other as possible.

The invention has as an object to provide a drive having a plurality of individually energized hydraulic motors and capable of maintaining the speeds of the several motors more nearly proportional to each other than is possible in the prior drives.

Another object is to provide a sectional drive in which the speed of one section may be varied relative to the speed of another section.

Another object is to provide a sectional drive in which the speed of one section and the speeds of all following sections may be varied relative to the speed of the preceding section.

Another object is to provide a sectional drive in which one section may be started or stopped independently of any other section.

Other and more specific objects and advantages will appear from the description hereinafter given of a drive in which the invention is embodied.

According to the invention in its general aspect, the drive includes a plurality of hydraulic transmissions one of which is in effect a master and the others of which are in effect followers and each of which includes a motor and a pump to energize the motor, the transmissions are connected in series, the pump of the master transmission delivers liquid at a measured rate through the motor of that transmission to the pump of the next transmission in the series, the pump of each of the follower transmissions increases the pressure of the liquid and delivers it through the motor of the same transmission to the pump of the next transmission in the series, and the pump of each follower transmission is automatically adjusted to vary its displacement until its volumetric capacity is just equal to the volume of the liquid supplied thereto.

The invention also provides means, such as a small pump, for adding to or subtracting from the liquid delivered to a follower pump to thereby vary the relative speed of the motor energized by that pump.

The invention also provides start and stop valves between adjacent transmissions so that one transmission may be started or stopped independently of another transmission.

The invention is exemplified by the drives shown schematically in the accompanying drawings in which the views are as follows:

Fig. 1 is a circuit diagram of a hydraulic drive embodying the invention.

Fig. 2 is a section through one of the bypass and brake valves shown in Fig. 1, the view being taken on the line 2—2 of that figure and showing the valve plunger in its normal position.

Fig. 3 is a section through the valve taken on the line 3—3 of Fig. 2.

Fig. 4 is a view similar to Fig. 3 but showing the plunger of the valve in its bypass position.

Fig. 5 is a circuit diagram of a modification of the drive shown in Fig. 1.

For the purpose of illustration, the invention has been shown embodied in a drive having only three sections A, B and C and as being employed to transmit power to three sections of a paper making machine from three electric motors but it is to be understood that the invention may be embodied in drives for other purposes, that the drive may be varied in size by varying the number of sections thereof and that the drives may transmit power to a machine from any suitable source. Since the paper making machine forms no part of the invention, it has been represented by three rollers 1, 2 and 3.

As shown, section A includes a variable displacement pump $4^a$ which is driven by an electric motor $5^a$, a hydraulic motor $6^a$ which has its inlet connected to pump $4^a$ by a channel $7^a$ and which is connected to roller 1 through a reduction gear $8^a$, and a bypass and brake valve $9^a$ which is connected to channel $7^a$ and to the outlet of motor $6^a$ by channels $10^a$ and $11^a$ respectively.

Section B includes a variable displacement pump $4^b$ which is driven by an electric motor $5^b$ and has its inlet connected to valve $9^a$ by a channel $12^b$, a hydraulic motor $6^b$ which has its inlet connected to pump $4^b$ by a channel $7^b$ and which is connected to roller 2 through a reduction gear $8^b$, and a bypass and brake valve $9^b$ which is connected to channel $7^b$ and to the outlet of motor $6^b$ by channels $10^b$ and $11^b$ respectively.

Section C includes a variable displacement pump $4^c$ which is driven by an electric motor $5^c$ and has its inlet connected to valve $9^b$ by a channel 12ᶜ, a hydraulic motor 6ᶜ which has its inlet connected to pump 4ᶜ by a channel 7ᶜ and which is connected to roller 3 through a reduction gear 8ᶜ, and a bypass and brake valve 9ᶜ which is connected to channel 7ᶜ and to the outlet of motor 6ᶜ by channels 10ᶜ and 11ᶜ respectively. Valve 9ᶜ has been shown as also connected to the inlet of pump 4ᵃ by a channel 12ᵃ.

Any one of the sections may be in effect a master and be provided with a control for determining the overall speed of the drive, the other sections being provided with controls which cause the speeds thereof to vary in accordance with variations in the speed of the master section.

As shown, pump 4ᵃ is provided with an electrically operated displacement varying mechanism or control 16ᵃ which may be controlled, for example, by one or more pairs of pushbutton switches (not shown) located at one or more convenient points so that closing one or the other switch of a pair of switches will cause control 16ᵃ to increase or decrease the displacement of pump 4ᵃ and thereby increase or decrease the speed of motor 6ᵃ.

Pumps 4ᵇ and 4ᶜ have their displacement varying members or slide blocks 17ᵇ and 17ᶜ constantly urged toward the zero displacement positions thereof by any suitable means. As shown, slide blocks 17ᵇ and 17ᶜ are urged toward the left by servo-motors 18ᵇ and 18ᶜ which are constantly supplied with liquid at a uniform pressure as will presently be explained. Slide blocks 17ᵇ and 17ᶜ are adapted to be moved toward the right to increase the displacement of pumps 4ᵇ and 4ᶜ by servo-motors 19ᵇ and 19ᶜ which are connected by channels 20ᵇ and 20ᶜ to channels 12ᵇ and 12ᶜ respectively.

The arrangement is such that servo-motors 18ᵇ and 18ᶜ constantly urge slide blocks 17ᵇ and 17ᶜ toward the left and tend to keep pumps 4ᵇ and 4ᶜ so adjusted that the capacities thereof are less than the volume of liquid delivered thereto which causes the pressure of the incoming liquid to rise and enable servo-motors 19ᵇ and 19ᶜ to shift slide blocks 17ᵇ and 17ᶜ toward the right until the capacity of each pump is exactly equal to the volume of liquid delivered thereto.

While pumps 4ᵇ and 4ᶜ have been shown provided with two single acting servo-motors, it is to be understood that any comparable means may be employed. For example, each pump may have its slide block urged in one direction by a spring and moved in the opposite direction by a single acting servo-motor or the slide block may be moved in opposite directions by a double acting servo-motor the piston of which has one face thereof exposed to liquid at a constant pressure and the other face thereof exposed to the pressure of the liquid delivered to the pump.

Valve 9ᵃ has a valve member or plunger 26 (Figs. 2 to 4) arranged in its casing 27 to control communication between four annular grooves or ports 28, 29, 30 and 31 formed in the bore of casing 27. Ports 28, 29 and 30 have channels 10ᵃ, 12ᵇ and 11ᵃ connected thereto respectively. Port 31 communicates with the inlet of a resistance valve 32 which discharges into a drain channel 33.

When valve plunger 26 is in its normal position as shown in Figs. 2 and 3, ports 28 and 31 are blocked and port 30 is open to port 29 so that the liquid discharged by pump 4ᵃ must flow through channel 7ᵃ to motor 6ᵃ and the liquid discharged by motor 6ᵃ into channel 11ᵃ is directed through channel 12ᵇ to the inlet of pump 4ᵇ. When valve plunger 26 is shifted to its bypass position as shown in Fig. 4, communication between ports 29 and 30 is blocked, port 28 is open to port 29 and port 30 is open to port 31 so that the liquid discharged by pump 4ᵃ is directed through channel 10ᵃ, valve 9ᵃ and channel 12ᵇ to pump 4ᵇ and the liquid discharged by motor 6ᵃ is directed through channel 11ᵃ, ports 30 and 31 and resistance valve 32 into drain channel 33, thereby bypassing motor 6ᵃ and imposing thereon a brake load equal to the resistance of resistance valve 32. Valves 9ᵇ and 9ᶜ are identical to valve 9ᵃ and function in the same manner.

When the plungers of valves 9ᵃ, 9ᵇ and 9ᶜ are in their normal positions, the pumps and motors of all of the sections are connected in series in a closed circuit which is kept filled with liquid by a gear pump 34 which in practice is driven in unison with one of the pumps and arranged in the casing thereof according to the usual practice but which has been shown as a separate pump. As shown, gear pump 34 draws liquid from a reservoir 35 and discharges enough liquid through a channel 36 into channel 12ᵃ to keep the circuit flooded and the remainder of the liquid discharged by gear pump 34 is exhausted through a relief valve 37 which enables gear pump 34 to maintain in channel 12ᵃ a pressure equal to the resistance of relief valve 37.

The liquid discharged by gear pump 34 into channel 12ᵃ is also utilized for energizing servo-motors 18ᵇ and 18ᶜ which are thus energized with liquid at a constant pressure. As shown, servo-motors 18ᵇ and 18ᶜ are connected to channel 12ᵃ by channels 38ᵇ and 38ᶜ respectively.

In order to compensate for slip in the system and to vary the speed of one motor relative to the speed of another motor so as, for example, to provide a draw between adjacent sections of a paper making machine, means may be provided for varying the rate at which liquid is delivered to the pump that energizes the motor the speed of which is to be varied.

The rate at which liquid is delivered to a pump may be varied by a control pump which adds to or subtracts from the liquid delivered thereto from the preceding transmission in the series. The control pump may be connected between the inlet of the main pump of a section and the outlet of the motor of the same section, in which case adjustment of the control pump will effect a variation in the speed of that section only, or the control pump may be connected between a source of liquid and the inlet of the main pump of a section in which case adjustment of the control pump will effect a variation in the speed of that section and the speed of any following section in the series.

As shown, sections B and C include, respectively, two small control pumps 40ᵇ and 40ᶜ having, respectively, electrically operated displacement varying mechanisms 41ᵇ and 41ᶜ which may be controlled by electric switches (not shown) arranged at convenient points. Pump 40ᶜ has one of its ports connected by a channel 42ᶜ to channel 12ᶜ and its other port connected by a channel 43ᶜ to channel 12ᵃ. Pump 40ᵇ has one of its ports connected by a channel 42ᵇ to channel 12ᵇ and its other port may either be connected by a channel 43ᵇ to channel 12ᵃ, as shown in Fig. 1, or be connected by a channel 53ᵇ to channel 11ᵇ as shown in Fig. 5.

Pumps 40ᵇ and 40ᶜ may be driven in any suitable manner. For example, pump 40ᵇ may be driven from motor 6ᵃ by means of a drive 44ᵇ and pump 40ᶜ may be driven from motor 6ᵇ by means of a drive 44ᶜ, as shown in Fig. 1, or pump 40ᵇ may be driven from motor 6ᵇ by means of a drive 54ᵇ and pump 40ᶜ may be driven from motor 6ᶜ by means of a drive 54ᶜ as shown in Fig. 5.

*Operation*

Assuming that the electric motors are running, that pumps 4ᵃ, 40ᵇ and 40ᶜ are at zero stroke and that the bypass valve plungers are in their normal positions, the drive will operate as follows:

Pumps 4ᵃ, 4ᵇ and 4ᶜ will be driven by the electric motors but, since pump 4ᵃ is at zero stroke, no liquid will be delivered thereby to energize motor 6ᵃ and, since no liquid is delivered by 4ᵃ, pumps 4ᵇ and 4ᶜ will be at zero stroke and no liquid will be delivered thereby to energize motors 6ᵇ and 6ᶜ.

When control 16ᵃ is operated to put pump 4ᵃ on stroke, pump 4ᵃ will deliver liquid through channel 7ᵃ to motor 6ᵃ and cause it to drive roller 1. The liquid discharged by motor 6ᵃ will flow through channel 11ᵃ, valve 9ᵃ and channel 12ᵇ to pump 4ᵇ but, since pump 4ᵇ is at zero stroke, the liquid cannot at first enter it. Consequently, liquid will flow through channel 20ᵇ to servomotor 19ᵇ and cause it to move slide block 17ᵇ toward the right until the displacement of pump 4ᵇ is just sufficient to receive the liquid delivered thereto. Pump 4ᵇ will then deliver liquid through channel 7ᵇ to motor 6ᵇ at sufficient pressure to cause it to drive roller 2.

The liquid discharged by motor 6ᵇ will flow through channel 11ᵇ, valve 9ᵇ and channel 12ᶜ to pump 4ᶜ but, since pump 4ᶜ is at zero stroke, the liquid cannot at first enter it. Consequently, liquid will flow through channel 20ᶜ to servomotor 19ᶜ and cause it to move slide block 17ᶜ toward the right until the displacement of pump 4ᶜ is just sufficient to receive the liquid delivered thereto. Pump 4ᶜ will then deliver liquid through channel 7ᶜ to motor 6ᶜ at sufficient pressure to cause it to drive roller 3. The liquid discharged by motor 6ᶜ will flow through channel 11ᶜ, valve 9ᶜ and channel 12ᵃ to pump 4ᵃ and at the same time gear pump 34 will deliver liquid into channel 12ᵃ to maintain pressure therein and to keep the circuit flooded.

The liquid discharged by pump 4ᵃ thus flows through motor 6ᵃ, pump 4ᵇ, motor 6ᵇ, pump 4ᶜ, motor 6ᶜ and back to pump 4ᵃ so that, if there were no slip in the system, motors 6ᵇ and 6ᶜ would each operate at a speed exactly proportional to the speed of the preceding motor in the series.

In the drive shown in Fig. 1, control pumps 40ᵇ and 40ᶜ may be adjusted to draw from channel 12ᵃ and to deliver into channels 12ᵇ and 12ᶜ just enough liquid to make up for slip. In the drive shown in Fig. 5, control pump 40ᶜ may be adjusted to draw from channel 12ᵃ and to deliver into channel 12ᶜ just enough liquid to make up for the slip of two transmissions and pump 40ᵇ may be adjusted to draw from channel 12ᶜ and to deliver into channel 12ᵇ just enough liquid to make up for the slip of one transmission. In either case, each of the motors 6ᵇ and 6ᶜ will operate at a speed exactly proportional to the speed of the preceding motor in the series.

If it is desired to vary the relative speeds of two drive sections for any reason, such as for the purpose of providing a draw between adjacent sections of a paper making machine, the control pump of one drive section may be adjusted to add to or to subtract from the liquid delivered to the pump of that section to thereby increase the volumetric delivery of the pump of that section with a resultant increase in the speed of the motor of that section.

For example, if pump 40ᵇ is adjusted to deliver liquid into channel 12ᵇ, the speed of motor 6ᵇ will be increased relative to the speed of motor 6ᵃ in accordance with the rate at which pump 40ᵇ delivers liquid into channel 12ᵇ in excess of the rate required to compensate for slip. Inversely, if pump 40ᵇ is adjusted to draw liquid from channel 12ᵇ, the speed of motor 6ᵇ will be decreased relative to the speed of motor 6ᵃ. Likewise, adjustment of pump 40ᶜ will cause the speed of motor 6ᶜ to vary relative to the speed of motor 6ᵇ.

If pump 40ᵇ is connected as shown in Fig. 1, adjustment thereof to effect a variation in the speed of motor 6ᵇ will also cause a corresponding variation (disregarding slip) in the speeds of all of the following motors in the series for the reason that the liquid delivered by motor 6ᵇ to the next pump in the series is correspondingly varied. If pump 40ᵇ is connected as shown in Fig. 5, adjustment thereof will effect a variation only in the speed of motor 6ᵇ for the reason that pump 40ᵇ subtracts liquid from the output of motor 6ᵇ at the same rate (disregarding slip) that motor 6ᵇ increases its output due to its increase in speed and, consequently, the rate at which motor 6ᵇ delivers liquid to the next pump in the series remains unchanged.

If it is desired to stop the motor of any section, the bypass valve of that section is adjusted to bypass that motor and impose a brake load thereon, as previously explained, but stopping one motor has no effect upon the other parts of the drive as the pump connected to that motor then delivers its output to the next pump in the series. If it is desired to start the motor of one section independently of the others, the bypass valve of that section is adjusted to its normal position and the bypass valves of the other sections are adjusted to their bypass positions.

If a larger number of machines or machine parts are to be driven, additional sections similar to section B are provided and connected into the drive in the same manner that section B is connected therein. If only two machines or machine parts are to be driven, section B is omitted and section C is connected to section A in the same manner that section B is connected thereto.

Master section A is necessarily the first section in the series but it may be arranged in any position in a row or other arrangement of sections. For example, section A may be connected to roller 2, section B connected to roller 3, and section C connected to roller 1 in which case section A would be the first section in the series but the second section in the row.

If section A is the first section in a row or other arrangement of sections, valve 9ᶜ is preferably connected to the inlet of pump 4ᵃ as shown but it may be connected to a drain channel providing that pump 4ᵃ is supplied with liquid and that servo-motors 19ᵇ and 19ᶜ are supplied with liquid at a uniform pressure such as by connecting each to the gear pump with which such pumps as pumps 4ᵃ and 4ᵇ are ordinarily provided.

The drive may be modified in various other ways and employed for various purposes without departing from the scope of the invention which is hereby claimed as follows:

1. A hydraulic drive comprising a first pump, a first motor, a second pump and a second motor connected in series so that said first pump delivers liquid to said first motor to energize it, said first motor delivers liquid to said second pump and said second pump increases the pressure of said liquid and delivers it to said second motor to energize the same, and means for varying the displacement of said second pump in response to a variation in the rate at which liquid is delivered to said second pump.

2. A hydraulic drive comprising a first pump, a first motor, a second pump and a second motor connected in series so that said first pump delivers liquid to said first motor to energize it, said first motor delivers liquid to said second pump and said second pump increases the pressure of said liquid and delivers it to said second motor to energize the same, means for varying the displacement of said second pump in response to a variation in the rate at which liquid is delivered to said second pump, and a valve connected between said second pump and said first pump and motor for bypassing said first motor and imposing a brake load thereon.

3. A hydraulic drive comprising a first pump, a first motor, a second pump and a second motor connected in series so that said first pump delivers liquid to said first motor to energize it, said first motor delivers liquid to said second pump and said second pump increases the pressure of said liquid and delivers it to said second motor to energize the same, a control pump for adding to or subtracting from the liquid delivered by said first motor to said second pump, and means for varying the displacement of said second pump in response to a variation in the rate at which liquid is delivered to said second pump.

4. A hydraulic drive comprising a first pump, a first motor, a second pump and a second motor connected in series so that said first pump delivers liquid to said first motor to energize it, said first motor delivers liquid to said second pump and said second pump increases the pressure of said liquid and delivers it to said second motor to energize the same, a control pump driven in unison with said first motor for adding to or subtracting from the liquid delivered by said first motor to said second pump, and means for varying the displacement of said second pump in response to a variation in the rate at which liquid is delivered to said second pump.

5. A hydraulic drive comprising a first pump, a first motor, a second pump and a second motor connected in series so that said first pump delivers liquid to said first motor to energize it, said first motor delivers liquid to said second pump and said second pump increases the pressure of said liquid and delivers it to said second motor to energize the same, a control pump for adding to or subtracting from the liquid delivered by said first motor to said second pump, means for varying the displacement of said second pump in response to a variation in the rate at which liquid is delivered to said second pump, and a valve connected between said second pump and said first pump and motor for bypassing said first motor and imposing a brake load thereon.

6. A hydraulic drive comprising a first pump, a first motor, a second pump and a second motor connected in series so that said first pump delivers liquid to said first motor to energize it, said first motor delivers liquid to said second pump and said second pump increases the pressure of said liquid and delivers it to said second motor to energize the same, said second pump having a displacement varying member constantly urged toward zero displacement position, a servo-motor for moving said member toward full displacement position and means connecting said servo-motor to the pump inlet so that liquid delivered to said second pump in excess of its adjusted capacity will cause said servo-motor to move said member until the capacity of said second pump is equal to the liquid delivered thereto.

7. A hydraulic drive comprising a first pump, a first motor, a second pump and a second motor connected in series so that said first pump delivers liquid to said first motor to energize it, said first motor delivers liquid to said second pump and said second pump increases the pressure of said liquid and delivers it to said second motor to energize the same, said second pump having a displacement varying member constantly urged toward zero displacement position, a servo-motor for moving said member toward full displacement position and means connecting said servo-motor to the pump inlet so that liquid delivered to said second pump in excess of its adjusted capacity will cause said servo-motor to move said member until the capacity of said second pump is equal to the liquid delivered thereto, and a valve connected between said second pump and said first pump and motor for bypassing said first motor and imposing a brake load thereon.

8. A hydraulic drive comprising a first pump, a first motor, a second pump and a second motor connected in series so that said first pump delivers liquid to said first motor to energize it, said first motor delivers liquid to said second pump and said second pump increases the pressure of said liquid and delivers it to said second motor to energize the same, and a control pump for adding to or subtracting from the liquid delivered by said first motor to said second pump, said second pump having a displacement varying member constantly urged toward zero displacement position, a servo-motor for moving said member toward full displacement position and means connecting said servo-motor to the pump inlet so that liquid delivered to said second pump in excess of its adjusted capacity will cause said servo-motor to move said member until the capacity of said second pump is equal to the liquid delivered thereto.

9. A hydraulic drive comprising a plurality of hydraulic transmissions arranged in a series and each including a pump and a motor, the pump of the first transmission in the series having its outlet connected to the motor of that transmission and its inlet connected by a channel to the outlet of the motor of the last transmission in the series and the pump of each of the other transmissions having its outlet connected to the inlet of the motor of the same transmission and its inlet connected to the outlet of the motor of the preceding transmission in the series so that each motor delivers liquid to the pump of another transmission, and means for varying the displacement of at least one of said pumps in response to a variation in the rate at which liquid is delivered to that pump.

10. A hydraulic drive comprising a plurality of hydraulic transmissions arranged in a series and each including a pump and a motor, the pump of the first transmission in the series having its outlet connected to the motor of that transmission and its inlet connected to a supply channel and the pump of each of the other transmissions having its outlet connected to the inlet of the motor of the same transmission and its inlet connected to the outlet of the motor of the preceding transmission in the series so that the liquid delivered by the pump of the first transmission flows through the motor of that transmission and then flows through the other transmissions successively, means for varying the displacement of at least one of said pumps in response to a variation in the rate at which liquid is delivered to that pump, and a control pump for adding to or subtracting from the liquid delivered by one transmission to the pump having means for varying its displacement.

11. A hydraulic drive comprising a plurality of hydraulic transmissions arranged in a series and each including a pump and a motor, the pump of the first transmission in the series having its outlet connected to the motor of that transmission and its inlet connected to a supply channel and the pump of each of the other transmissions having its outlet connected to the inlet of the motor of the same transmission and its inlet connected to the outlet of the motor of the preceding transmission in the series so that the liquid delivered by the pump of the first transmission flows through the motor of that transmission and then flows through the other transmissions successively, means for varying the displacement of the pump of each of said other transmissions in response to a variation in the rate at which liquid is delivered to that pump, and a control pump connected between said channel and the inlet of the pump of one of said other transmissions for transmitting liquid therebetween to vary the flow of liquid to that pump and thereby vary the speed of the motor of said one transmission and the speeds of the motors of any following transmissions in the series relative to the speed of the motor of said first transmission.

12. A hydraulic drive comprising a plurality of hydraulic transmissions arranged in a series and each including a pump and a motor, the pump of the first transmission in the series having its outlet connected to the motor of that transmission and its inlet connected to a supply channel and the pump of each of the other transmissions having its outlet connected to the inlet of the motor of the same transmission and its inlet connected to the outlet of the motor of the preceding transmission in the series so that the liquid delivered by the pump of the first transmission flows through the motor of that transmission and then flows through the other transmissions successively, means for varying the displacement of the pump of each of said other transmissions in response to a variation in the rate at which liquid is delivered to that pump, and a control pump connected between the inlet of the pump of one of said other transmissions and the outlet of the motor of the same transmission for transmitting liquid therebetween to vary the flow of liquid to that pump and thereby vary the speed of the motor of said one transmission relative to the speed of the motor of said first transmission without affecting the speed of the motors of any other transmission in the series.

13. A hydraulic drive comprising a plurality of hydraulic transmissions arranged in a series and each including a pump and a motor, the pump of the first transmission in the series having its outlet connected to the motor of that transmission and its inlet connected by a channel to the outlet of the motor of the last transmission in the series and the pump of each of the other transmissions having its outlet connected to the inlet of the motor of the same transmission and its inlet connected to the outlet of the motor of the preceding transmission in the series so that each motor delivers liquid to the pump of another transmission, means for varying the displacement of at least one of said pumps in response to a variation in the rate at which liquid is delivered to that pump, a control pump connected between adjacent transmissions for adding to or subtracting from the liquid delivered by the motor of one transmission to the pump of the other transmission, and a valve connected between adjacent transmissions for bypassing the motor of one of said transmissions to render the same inoperative.

14. A hydraulic drive comprising a plurality of hydraulic transmissions arranged in a series and each including a pump and a motor, the pump of the first transmission in the series having its outlet connected to the motor of that transmission and its inlet connected by a channel to the outlet of the motor of the last transmission in the series and the pump of each of the other transmissions having its outlet connected to the inlet of the motor of the same transmission and its inlet connected to the outlet of the motor of the preceding transmission in the series so that each motor delivers liquid to the pump of another transmission, means for varying the displacement of at least one of said pumps in response to a variation in the rate at which liquid is delivered to that pump, a control pump connected between adjacent transmissions and driven in unison with the motor of one of said transmissions for adding to or subtracting from the liquid delivered by the motor of that transmission to the pump of the other transmission, and a valve connected between adjacent transmissions for directing the output of the pump of the first of the two transmissions directly to the pump of the other of the two transmissions and for imposing a brake load upon the motor of said first transmission.

15. A hydraulic drive comprising a plurality of hydraulic transmissions arranged in a series and each including a pump and a motor, the pump of the first transmission in the series having its outlet connected to the motor of that transmission and its inlet connected by a channel to the outlet of the motor of the last transmission in the series and the pump of each of the other transmissions having its outlet connected to the inlet of the motor of the same transmission and its inlet connected to the outlet of the motor of the preceding transmission in the series so that each motor delivers liquid to the pump of another transmission, means for supplying liquid to said channel at a substantially constant pressure to keep the circuit of said drive flooded, a control pump having one of its ports connected to the connection between adjacent transmissions and its other port connected to said channel for transmitting liquid therebetween to thereby vary the rate at which liquid is delivered by the motor of one of those transmissions to the pump of the other of those transmissions, and means for adjusting the pump of said other transmission to vary the displacement thereof in response to a variation in the rate at which liquid is delivered thereto.

16. A hydraulic drive comprising a plurality of hydraulic transmissions arranged in a series and each including a pump and a motor, the pump of the first transmission in the series having its outlet connected to the motor of that transmission and its inlet connected by a channel to the outlet of the motor of the last transmission in the series and the pump of each of the other transmissions having its outlet connected to the inlet of the motor of the same transmission and its inlet connected to the outlet of the motor of the preceding transmission in the series so that each motor delivers liquid to the pump of another transmission, means for supplying liquid to said channel at a substantially constant pressure to keep the circuit of said drive flooded, a control pump having one of its ports connected to the connection between adjacent transmissions and its other port connected to said channel for transmitting liquid therebetween to thereby vary the rate at which liquid is delivered by the motor of one of those transmissions to the pump of the other of those transmissions, means for adjusting the pump of said other transmission to vary the displacement thereof in response to a variation in the rate at which liquid is delivered thereto, and valves connected between adjacent transmissions and each adapted when operated to bypass and impose a brake load upon the motor of the preceding transmission.

RANSOM TYLER.